United States Patent
Morman

Patent Number: 6,138,979
Date of Patent: Oct. 31, 2000

[54] ISOLATING FOOT PAD

[76] Inventor: Lawrence M. Morman, 807 Loch Lomond La., Worthington, Ohio 43085

[21] Appl. No.: 09/239,623

[22] Filed: Jan. 28, 1999

[51] Int. Cl.$^7$ ........................................................ F16M 1/00
[52] U.S. Cl. ..................... 248/638; 248/188.4; 248/188.9; 248/650
[58] Field of Search .............................. 248/188.2, 188.3, 248/188.4, 188.8, 188.9, 677, 649, 650, 638

[56] References Cited

U.S. PATENT DOCUMENTS

| | | |
|---|---|---|
| 1,757,962 | 5/1930 | Herold .............................. 248/188.8 X |
| 3,208,707 | 9/1965 | Blumrich .......................... 248/188.8 X |
| 3,815,852 | 6/1974 | May . | 
| 4,575,034 | 3/1986 | Tobey . |
| 4,576,357 | 3/1986 | Schrepfer .......................... 248/188.2 X |
| 4,718,631 | 1/1988 | Reynolds et al. . |
| 4,846,436 | 7/1989 | Young et al. . |
| 5,148,892 | 9/1992 | Lu ......................................... 248/188.4 |
| 5,771,990 | 6/1998 | Liang . |
| 5,872,340 | 2/1999 | Anagnos et al. .................... 248/638 X |

*Primary Examiner*—Ramon O. Ramirez
*Assistant Examiner*—A. Joseph Wujciak, III
*Attorney, Agent, or Firm*—John L. Gray, Esq.; Kegler, Brown, Hill & Ritter

[57] ABSTRACT

An isolating foot pad for heavy equipment provided with an elastomeric dampening base and an inverted metallic cylindrical member in the base. A bolt is positioned in said cylindrical member with the shaft of the bolt extending upwardly to engage the heavy equipment. The side movement of the head of the bolt is constrained and the angular movement of the bolt shaft is also limited by a retaining ring in the cylindrical member.

6 Claims, 3 Drawing Sheets

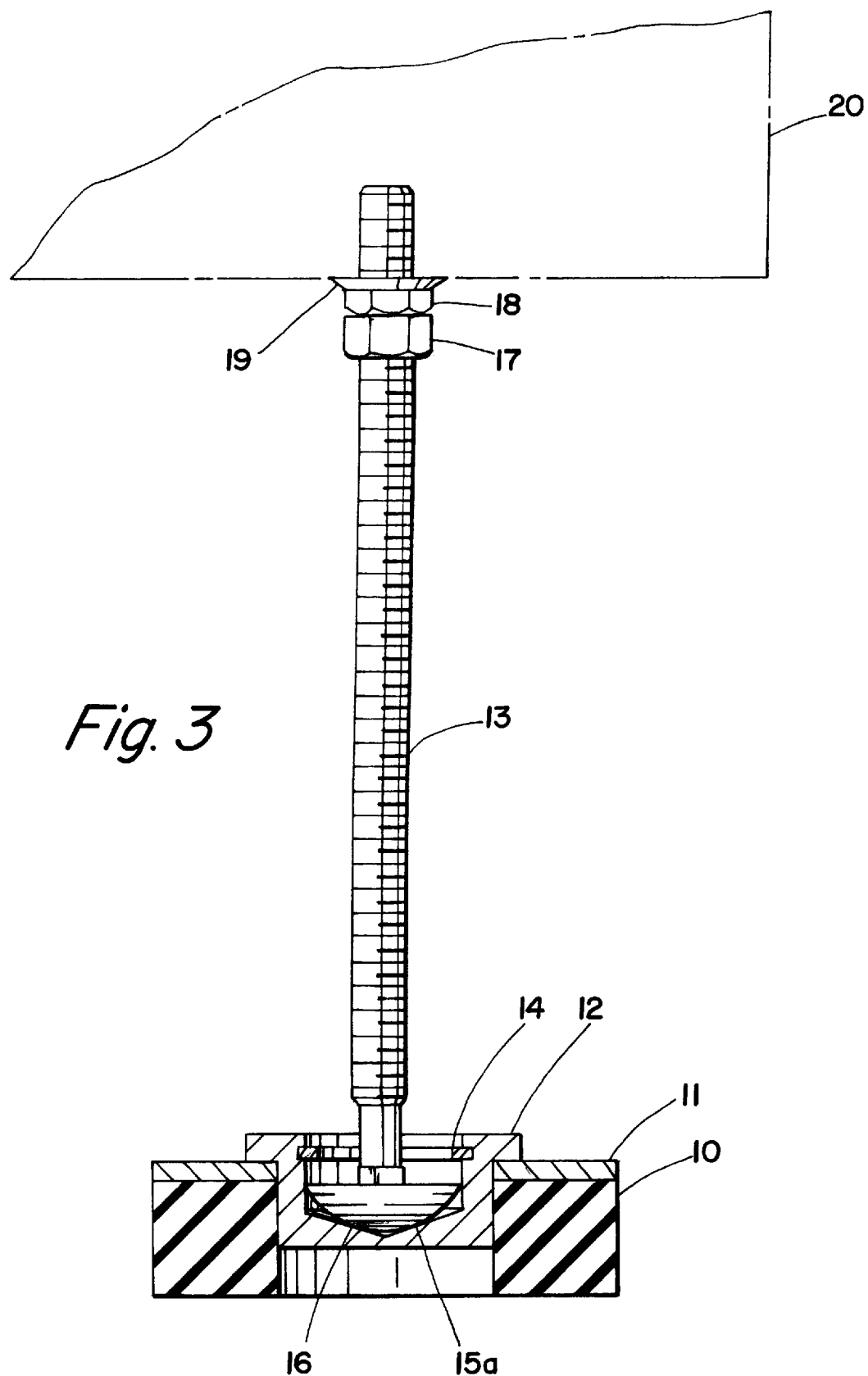

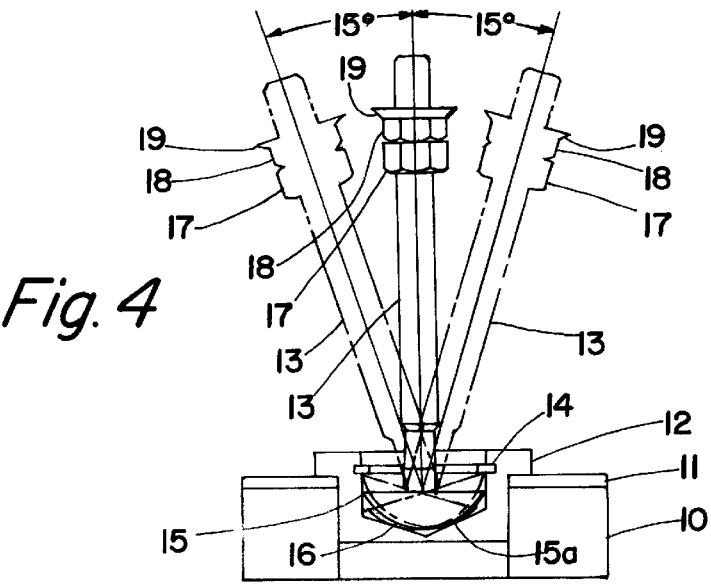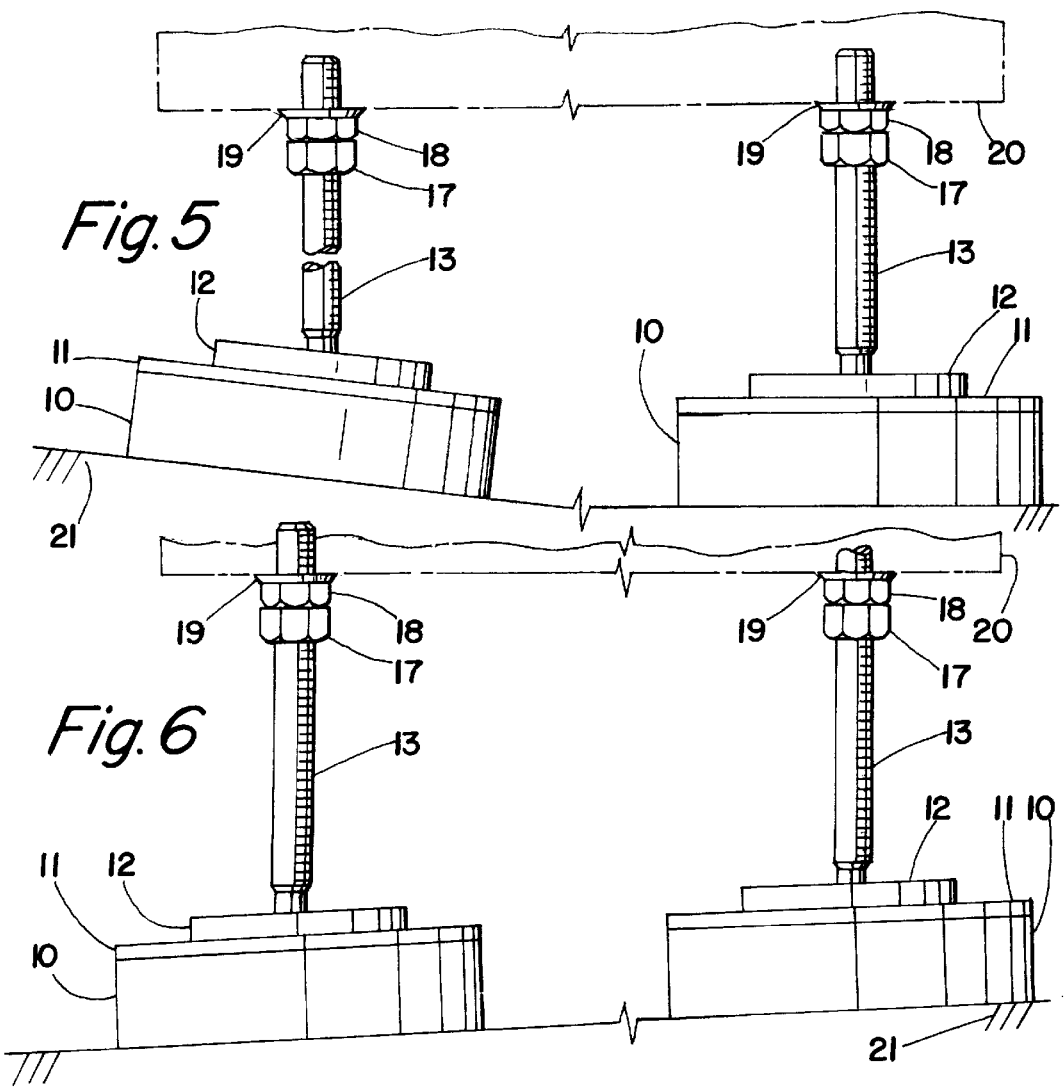

ISOLATING FOOT PAD

BACKGROUND OF THE INVENTION

Foot pads are commonly used to support heavy equipment, including large computers. The purpose of these footpads is to dampen any vibration that could be transmitted to or from the equipment and also to compensate for any differences in levels of the surface on which the equipment is placed. An example of such a foot pad is shown in U.S. Pat. No. 4,575,034 Tobey which uses either a flat or a hemispherical shaped depression to support the bolt head. In the Tobey disclosure, the bolt is free to move horizontally to accommodate variations in the location of the corresponding opening in the heavy equipment.

BRIEF SUMMARY OF THE INVENTION

Applicant's isolating foot pad utilizes a combination of elastomeric material to dampen vibration and an inexpensively made receptacle to hold a threaded bolt head which is free to rotate a fixed degree but constrained by an internal retaining ring and also is provided with a locking type threaded support on the bolt head which may be adjusted for the particular equipment to be placed thereon.

It is therefore an object of this invention to provide an isolating foot pad for heavy equipment which includes vibration dampening features.

It is also an object of this invention to provide an isolating foot pad which compensates for variations in the shape of the floor on which the piece of heavy equipment will be set.

It is still a further object of this invention to provide such an isolating foot pad where the support of the heavy equipment may be adjusted and then locked in place.

This, together with other objects of the invention, will become apparent from the following detailed description of the invention and the accompanying drawings.

BRIEF DESCRIPTION OF THE DRAWINGS

FIG. 3. A side elevation view partly in section on section lines 3—3 showing Applicant's invention.

FIG. 4. Shows the variation in the rotation of the support bolt which may be employed in Applicant's invention.

FIG. 5. Shows Applicant's invention utilized in an uneven floor surface.

FIG. 6. Shows Applicant's invention where the undersurface of the heavy equipment supported is not perfectly flat.

DETAILED DESCRIPTION OF THE INVENTION

Figure 1:
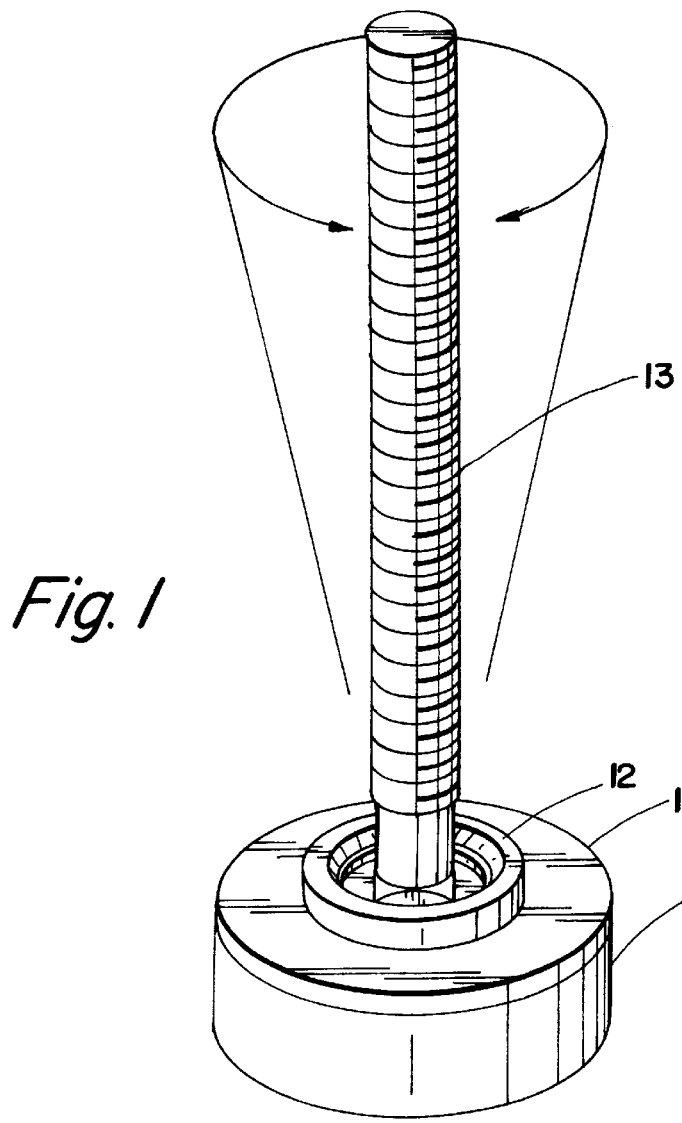
FIG. 1. A perspective view of Applicant's invention.

Referring now to FIG. 1, there is shown Applicant's invention including an elastomeric hollow cylindrical member 10 having a flat upper surface to which may be adhesively attached a circular metallic member 11. Circular metallic member 11 will have the same horizontal surface dimensions as the elastomeric material 10. Adhesively attached to both circular metallic member 11 and the elastomeric material 10, in the center thereof, is metallic member 12. Positioned in metallic member 12 is a bolt 13 and it is held in place by a snap ring 14 shown in FIG. 2.

Figure 2:
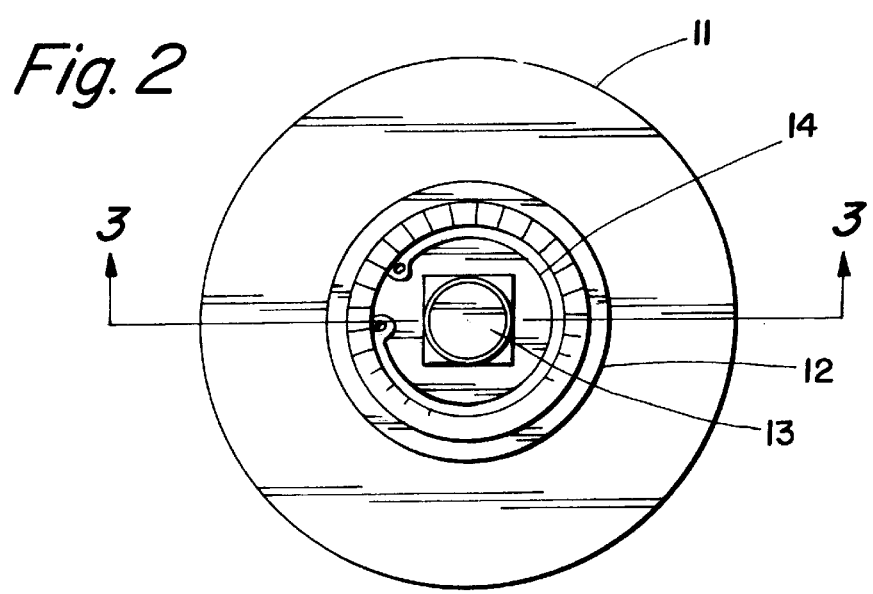
FIG. 2. A top plan view of Applicant's invention.

Referring now to FIG. 3, which is a section of FIG. 2 on the section lines 3—3, the elastomeric material 10 is shown with the circular metallic member 11 thereon and the metallic member 12, the bolt 13 and the snap ring 14.

It should be noted that the interior of the metallic member 12 is in the form of a cylinder 15a that terminates in a cone shaped portion 15a. This is much easier and cheaper to construct than would be a hollow hemispherical portion to coincide with the shape of the bolt head 16 but also distributes the weight evenly to the cone shaped portion 15a at any angle of the bolt head 16 as allowed by the diameter of the cylinder 15 and the retaining ring 14. Two nuts 17 and 18 are provided on the bolt, nut 18 having a flat portion 19 which is used to support the equipment shown in dotted outline 20. When nut 17 is screwed tightly up against 18, it causes 18 to be locked in place.

Referring now to FIG. 4, the bolt is shown in various positions and the bolt head movement is shown being limited by retaining ring 14 with a consequent limitation of the radius of the movement of bolt 13 to a preferred amount of 15°.

Referring now to FIG. 5, two of the isolating foot pads are shown on an exaggerated uneven floor surface 21 supporting heavy equipment 20 which shows how the unit will successfully compensate for changes in the surface level of the floor 21 while still maintaining the heavy equipment 20 level.

Referring now to FIG. 6, there is shown the use of Applicant's isolating foot pad invention in a situation where the heavy equipment is not perfectly level but the floor is level so that Applicant's invention compensates for the variations in the shape of the heavy equipment.

By utilizing Applicant's invention, stability and vibration dampening in the support of heavy equipment can be utilized with the ability to compensate in variations in floor dimensions as well as equipment dimensions. Not only that but Applicant's invention is very cheap and easy to assemble.

While this invention has been shown and described with respect to a detailed embodiment thereof, it will be understood by those skilled in the art that various changes in form and detail thereof may be made without departing from the scope of the claims of the invention.

What is claimed is:

1. An isolating foot pad for heavy equipment comprising a hollow cylindrical elastomeric unit having upper and lower flat circular parallel surface;

a first circular metallic member of a size and shape to be supported on the upper flat circular surface of said elastomeric unit;

a second circular metallic member inserted of a size and shape to fit within said first circular metallic member and to be supported thereby and also to extend into said first circular metallic member and said elastomeric unit;

a portion of said second circular metallic member which extends into the hollow portion of said first circular metallic member and a hollow portion of said elastomeric unit being provided with a centrally disposed hollow cylindrical depression therein, the diameter of said depression being of a size to hold a bolt head therein and to prevent sideways movement of said bolt head;

a bolt having a hemispherical head in said centrally disposed hollow cylindrical depression and the shaft of said bolt extending vertically from said depression;

a retaining ring positioned in said depression in said second metallic member and above said bolt head and having an opening through which the shaft of said bolt extends.

2. The isolating foot pad for heavy equipment of claim 1 wherein said opening in said retaining ring is of a size to limit the rotational movement of said bolt.

3. The isolating foot pad of claim 2 wherein said bolt shaft is threaded.

4. The isolating foot pad of claim 3 wherein there are two nuts on said threaded shaft.

5. The isolating foot pad of claim 1 wherein said first circular metallic member is adhesively attached to said elastomeric unit and wherein said second metallic member is adhesively attached to said first metallic member and to said elastomeric unit.

6. The isolating foot pad of claim 1 wherein said centrally disposed hollow cylindrical depression terminates at its base in the shape of an inverted cone.

* * * * *

UNITED STATES PATENT AND TRADEMARK OFFICE
CERTIFICATE OF CORRECTION

PATENT NO. : 6,138,979
DATED : 10/31/2000
INVENTOR(S) : Lawrence M. Morman

It is certified that error appears in the above-identified patent and that said Letters Patent are hereby corrected as shown below:

In Claim 1, column 2, line 54, --- a hole of --- is inserted after the word "within"

Signed and Sealed this

Eighth Day of May, 2001

*Attest:*

NICHOLAS P. GODICI

*Attesting Officer*     *Acting Director of the United States Patent and Trademark Office*